(12) United States Patent
Furihata et al.

(10) Patent No.: US 9,256,811 B2
(45) Date of Patent: Feb. 9, 2016

(54) RECORDING MEDIUM PROCESSING APPARATUS

(75) Inventors: Hideki Furihata, Okaya (JP); Shinsuke Tomomatsu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 553 days.

(21) Appl. No.: 12/945,927

(22) Filed: Nov. 15, 2010

(65) Prior Publication Data

US 2011/0129280 A1 Jun. 2, 2011

(30) Foreign Application Priority Data

Nov. 30, 2009 (JP) ................................ 2009-271231

(51) Int. Cl.
*B41J 11/00* (2006.01)
*G06K 13/16* (2006.01)
*B65H 5/06* (2006.01)

(52) U.S. Cl.
CPC .............. *G06K 13/16* (2013.01); *B41J 11/006* (2013.01); *B65H 5/062* (2013.01); *B65H 2402/441* (2013.01); *B65H 2404/144* (2013.01); *B65H 2404/1521* (2013.01); *B65H 2404/6111* (2013.01); *B65H 2601/11* (2013.01); *B65H 2701/1912* (2013.01)

(58) Field of Classification Search
CPC . B41J 11/006; G06K 13/16; B65H 2402/441; B65H 2701/1912; B65H 2601/11
USPC ......... 400/578, 642, 691, 692, 693, 605, 607; 399/21
IPC ....................................................... B41J 29/02
See application file for complete search history.

(56) References Cited

U.S. PATENT DOCUMENTS

| 4,978,968 A | 12/1990 | Ishikawa et al. |
|---|---|---|
| 5,321,470 A * | 6/1994 | Hasuo et al. ................. 399/366 |
| RE35,319 E * | 8/1996 | Yamada et al. ............... 400/605 |
| 5,897,259 A | 4/1999 | Ahn |
| 6,350,005 B1 | 2/2002 | Asai et al. |
| 8,340,391 B2 | 12/2012 | Petermann |
| 2002/0067386 A1 | 6/2002 | Asai et al. |

(Continued)

FOREIGN PATENT DOCUMENTS

| CN | 1537726 A | 10/2004 |
|---|---|---|
| JP | 63139754 A | 6/1988 |

(Continued)

*Primary Examiner* — Jennifer Simmons
(74) *Attorney, Agent, or Firm* — Nutter McClennen & Fish LLP; John J. Penny, Jr.

(57) ABSTRACT

A head performs recording or reading information with respect to a sheet-shaped recording medium. A pair of rollers sandwich therebetween and transport the recording medium in a transport path of the recording medium passing through the head. A cantilevered frame extends while being cantilevered in a direction traversing the transport path. One end of an opening and closing unit is rotatably supported by the cantilevered frame. The opening and closing unit is revolvable around the one end to move between a closed position where the opening and closing unit covers at least a transport portion by the pair of rollers in the transport path and an open position where the transport position is exposed to the outside.

15 Claims, 8 Drawing Sheets

(56) References Cited

U.S. PATENT DOCUMENTS

| | | |
|---|---|---|
| 2003/0001101 A1 | 1/2003 | Homme et al. |
| 2004/0265032 A1 | 12/2004 | Furihata et al. |
| 2006/0115312 A1* | 6/2006 | Furihata et al. .............. 400/149 |
| 2006/0131406 A1* | 6/2006 | Cato .......................... 235/432 |
| 2008/0130070 A1 | 6/2008 | Walker et al. |
| 2008/0156875 A1 | 7/2008 | Kinoshita et al. |
| 2008/0260448 A1* | 10/2008 | Tsuchiya et al. ............. 400/621 |
| 2010/0289211 A1 | 11/2010 | Nireki |
| 2011/0315768 A1 | 12/2011 | Kinoshita et al. |
| 2013/0134223 A1 | 5/2013 | Kinoshita et al. |

FOREIGN PATENT DOCUMENTS

| | | |
|---|---|---|
| JP | 6222629 A | 8/1994 |
| JP | 2000043339 A | 2/2000 |
| JP | 2000313109 A | 11/2000 |
| JP | 2003-006713 A | 1/2003 |
| JP | 2004029271 A | 1/2004 |
| JP | 2007-125741 A | 5/2007 |
| JP | 2008-162750 A | 7/2008 |
| JP | 2009049725 A | 3/2009 |
| WO | 2009/074201 A1 | 6/2009 |
| WO | 2009/088090 A1 | 7/2009 |

* cited by examiner

RECORDING MEDIUM PROCESSING APPARATUS

The disclosure of Japanese Patent Application No. 2009-271231 filed on Nov. 30, 2009, including specification, drawings and claims are incorporated herein by reference in its entirety.

BACKGROUND

The present invention relates to a recording medium processing apparatus which transports a sheet-shaped recording medium, such as a check along a transport path passing through a plurality of heads and a pair of transport rollers.

There is a check processing apparatus which reads information inscribed in magnetic ink characters (MICR) from a sheet-shaped recording medium, such as a check, and performs printing on the recording medium by a recording head. The check processing apparatus includes a magnetic reading head which reads the magnetic ink characters. In the check processing apparatus, a transport path is provided which passes through a recording bead for performing printing. Thus, a check or the like is transported along the transport path. For example, in a small check reading apparatus, a magnetic reading head is arranged in a transport path portion which linearly extends from a check insertion port provided at the front surface of the apparatus toward the depth side of the apparatus. A recording head is arranged in a transport path portion which passes through a deep curved transport path portion upward or forward of the apparatus.

Patent Document 1 describes this type of recording medium processing apparatus (multi-function processing apparatus). In the multi-function processing apparatus of Patent Document 1, a check processing section which includes a magnetic reading head and a recording head is provided at the front portion of the apparatus, and a roll sheet unit which performs printing on a roll sheet is provided at the rear of the check processing section. In the multi-function processing apparatus, the rear end of the roll sheet unit is rotatably supported by a rotary support shaft provided at the rear side of the apparatus, such that the roll sheet unit revolves upward of the apparatus, opening and closing a unit cover in the top surface of the apparatus. Thus, the recording head arranged in a portion extending longitudinally in the second half of the transport path in the check processing section is exposed, making it easy to perform the replacement of consumables in the recording head or the maintenance of a cutter device provided in front of the check discharge port.

Patent Document 1: JP-A-2000-43339

With the configuration of Patent Document 1, the roll sheet unit is opened/closed, such that it is possible to expose the transport path portion which extends longitudinally toward the check discharge port in the top surface of the apparatus. However, it is impossible to expose the curved transport path portion from the transport path portion which transversely extends from the check insertion port at the front surface rearward of the apparatus to the transport path portion which extends longitudinally. Arranged in the curved portion are a pair of transport rollers, such as a pair of transport rollers which are provided in the vicinity of the magnetic reading head (provided in the transverse transport path portion), a pair of transport rollers which are provided in the vicinity of the recording head (provided in the longitudinal transport path portion). That is, the portion is at the deepest position of the transport path and shielded from the check insertion port and the check discharge port by the two pairs of transport rollers, making it difficult to access the portion from either the check insertion port or the check discharge port. For this reason, if a paper jam occurs in the portion, a hand does not reach the position where the paper jam occurs. Thus, in order to remove the jammed check, the apparatus has to be disassembled. Disassembly causes a problem in that it takes time and effort to recover the original state. In addition, there is a problem in that, at the time of disassembling the apparatus, components may be broken or lost, and the apparatus may not be reconstituted to its original state.

SUMMARY

It is therefore an object of at least one embodiment of the present invention to provide a recording medium processing apparatus in which a portion (a transport position by a pair of transport rollers) which is at a deep position of a transport path for transporting a recording medium, such as a check, can be easily exposed, making it easy to perform maintenance for recovering from trouble, such as a paper jam, in the portion.

In order to achieve at least one of the above-described objects, according to an aspect of the embodiments of the present invention, there is provided a recording medium processing apparatus, comprising: a head that performs recording or reading information with respect to a sheet-shaped recording medium; a pair of rollers that sandwich therebetween and transport the recording medium in a transport path of the recording medium passing through the head; a cantilevered frame that extends while being cantilevered in a direction traversing the transport path; and an opening and closing unit, one end of which is rotatably supported by the cantilevered frame, wherein the opening and closing unit is revolvable around the one end to move between a closed position where the opening and closing unit covers at least a transport portion by the pair of rollers in the transport path and an open position where the transport position is exposed to the outside.

According to the aspect of the embodiments of the present invention, as described above, the cantilevered frame is used in the configuration in which a groove-shaped transport path with an open lateral end is provided. That is, the opening and closing unit, one end of which is rotatably supported by the cantilevered frame, is provided, such that at, least the portion corresponding to the pair of rollers in the transport path can be opened/closed. With this configuration, a portion which is at a deep position of the transport path and shielded from the insertion port or the discharge port of the recording medium by the pair of rollers can be exposed to the outside as occasion demands. Therefore, when the recording medium is jammed in the portion, the recovery can be easily performed and maintenance of the portion can be easily performed.

In the recording medium processing apparatus, the cantilevered frame may be an upper edge portion of a front frame which constitute a front surface portion of the recording medium processing apparatus, formed with an insertion port of the recording medium into the transport path, and the opening and closing unit may move around a rotation center line extending along the upper edge portion between the open position where the opening and closing unit is raised upward of the transport path and the closed position where the opening and closing unit lowered along the transport path. As described above, according to the aspect of the embodiments of the present invention, the opening and closing unit can be supported by the upper edge portion of the front frame, and a mechanism which is arranged above the deep portion of the transport path can be made as a single body with the opening and closing unit. Therefore, the opening and closing unit can revolve upward to the insertion port of the recording medium, such that the deep portion of the transport path can be opened/closed.

At this time the transport path may include: a first transport path portion which extends from the insertion port rearward of the apparatus; an arc-shaped transport path portion which is curved upward from a rear end of the first transport path portion; and a second transport path portion which extends from a rear end of the arc-shaped transport path portion to a discharge port of the recording medium, formed in a top surface of the recording medium processing apparatus, and at least the arc-shaped transport path portion may be exposed to the outside when the opening and closing unit is in the open position. With this configuration, for example, a mechanism which is an upward portion of the arc-shaped transport path portion and provided near the front surface of the apparatus from the arc-shaped transport path portion and the second transport path portion is loaded onto the opening and closing unit and moved along with the opening and closing unit, such that the arc-shaped transport path portion can be exposed to the outside. Therefore, a recording medium jammed in the curved portion of the transport path can be easily removed, and recovery from trouble in the portion can be easily performed.

The head may include a first head which is provided in the first transport path portion and a second head which is provided in the second transport path portion, the pair of rollers may include a first pair of rollers which sandwich therebetween and transport the recording medium in the vicinity of the first head and a second pair of rollers which sandwich between and transport the recording medium in the vicinity of the second head, and at least a portion of the transport path between the first pair of rollers and the second pair of rollers may be exposed to the outside when the opening and closing unit is in the open position. As described above, a pair of transport rollers are provided in the vicinity of each head, improving transport accuracy of the recording medium when passing through the head. A recording medium jammed in the transport path between a plurality of heads (a portion between a plurality of pairs of rollers) can be easily removed.

At this time, at least one of the first pair of rollers and the second pair of rollers may include a separating roller which is attached to the opening and closing unit and a fixed roller which is attached to a main frame fixed to or integrally formed with the front frame such that the recording medium is sandwiched between the separating roller and the fixed roller. With this configuration, the opening and closing unit is moved to the open position, such that the separating roller can be separated from the fixed roller. Therefore, it becomes possible to easily remove a recording medium jammed between the rollers.

When the first head is a magnetic reading head, the first pair of rollers may be configured such that the recording medium is sandwiched between a roller attached to the front frame and a roller attached to the main frame. With this configuration, a pair of rollers provided in the vicinity of the magnetic reading head do not move even when the opening and closing unit operates, maintaining the attachment state with high accuracy. Therefore, it is possible to prevent the transport accuracy of the recording medium in the vicinity of the magnetic reading head from being degraded due to the opening and closing operation of the opening and closing unit.

In the recording medium processing apparatus, the second head may be a recording head and loaded onto the opening and closing unit. With this configuration, the entire recording head including the portion along the transport path can be moved along with the opening and closing unit and exposed to the outside, making it easy to perform maintenance of the recording head and replacement of consumables.

In the recording medium processing apparatus, the opening and closing unit may be provided with a guide surface which guides the recording medium along the transport path when the opening and closing unit is in the closed position. With this configuration, the guide surface moves with the movement of the opening and closing unit to the open position, such that the recording medium is exposed immediately. Therefore, the transport path can be opened/closed only by the opening and closing operation of the opening and closing unit.

At this time, the transport path may be a groove which is defined by a first guide surface guiding one surface of the recording medium and a second guide surface guiding the other surface of the recording medium, and the groove may be opened toward a forefront of the cantilevered frame. As described above, if the transport path is formed in a groove shape with one open end, it is possible to transport a recording medium of a size equal to or greater than the width of the transport path. With this configuration, the frame which supports the guide surfaces is formed in a state of being cantilevered such that the forefront extends toward the opening of the groove, such that the opening and closing unit can be supported by the cantilevered frame.

According to the aspect of the embodiment of the present invention, the opening and closing unit which opens/closes at least a portion corresponding to a pair of rollers in the transport path is provided by using the cantilevered frame. Thus, the portion which is at the deep position of the transport path and shielded from the insertion port or the discharge port of the recording medium by the pair of rollers can be exposed to the outside as occasion demands. Therefore, recovery when a recording medium is jammed in the portion can be easily performed, and maintenance of the portion can be easily performed.

DETAILED DESCRIPTION OF THE EMBODIMENTS

Hereinafter, an embodiment of a check processing apparatus to which the invention is applied will be described with reference to the drawings.

(Overall Configuration)

Figure 1:
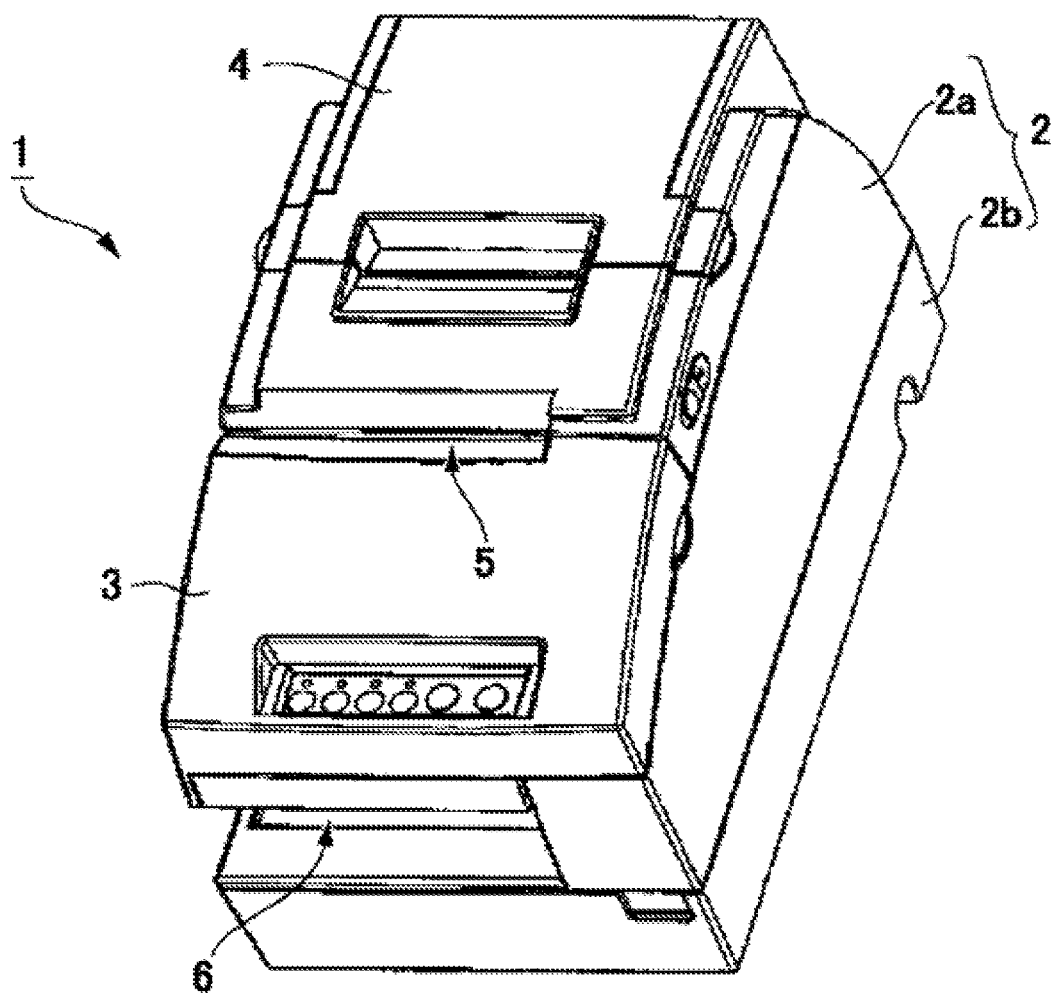
FIG. 1 is an exterior perspective view of a check processing apparatus when viewed from an oblique right front side.
Figure 2:
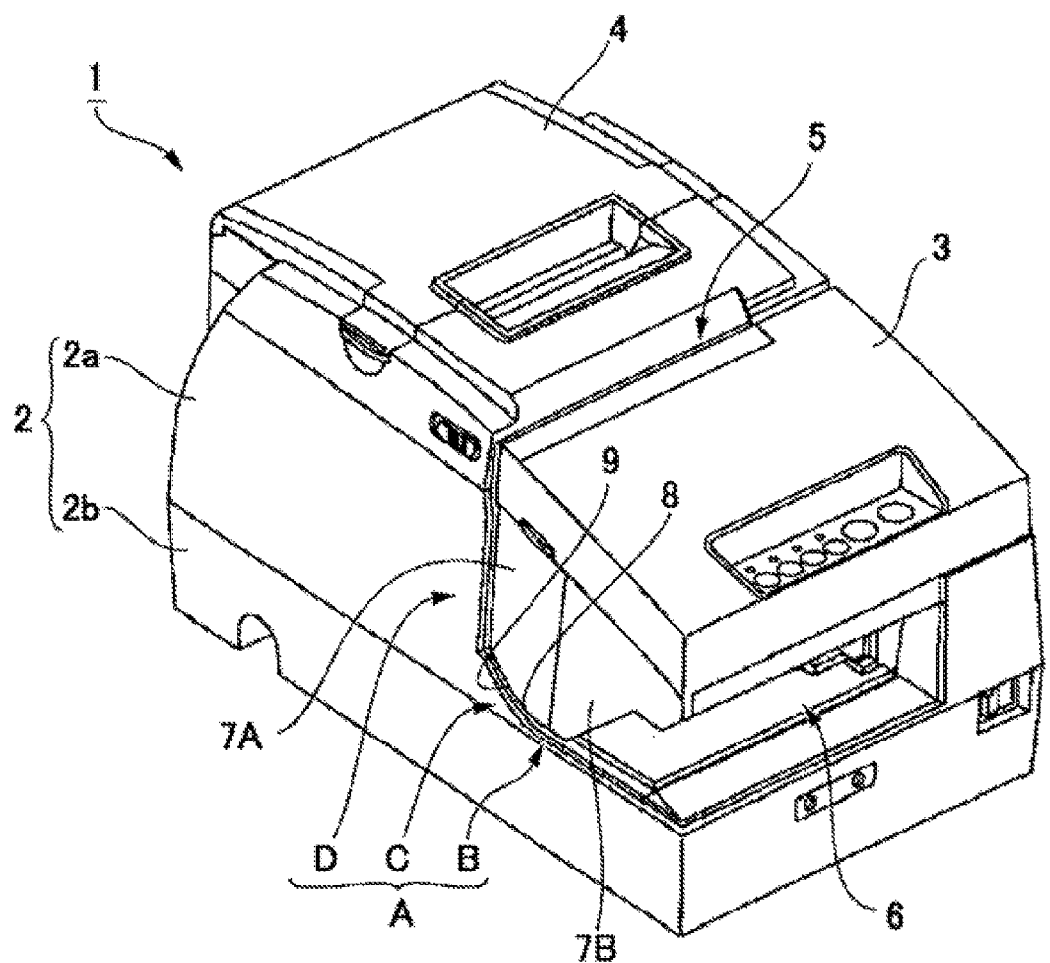
FIG. 2 is an exterior perspective view of the check processing apparatus when viewed from an oblique left front side.

FIGS. 1 and 2 are exterior perspective views of a check processing apparatus. FIG. 1 is an exterior perspective view when viewed from an oblique right front side. FIG. 2 is a perspective view when viewed from an oblique left front side. A check processing apparatus 1 (recording medium processing apparatus) includes a main body case 2, an opening and closing unit cover 3 which is provided at the forward upper part of the main body case 2, and a roll sheet unit cover 4 which is provided at the rearward upper part of the main body case 2. In the top surface of the check processing apparatus 1, a narrow groove-shaped check discharge port 5 is provided in a space between the rear end of the opening and closing unit cover 3 and the front end of the roll sheet unit cover 4 to extend in the apparatus width direction. The main body case 2 includes a middle case 2a and a lower case 2b. A check insertion port 6 into which a check (recording medium) is inserted manually is formed at a position to the front left side of the middle case 2a. The check insertion port 6 is, formed in a slightly wide groove extending in the apparatus width direction.

As shown in FIG. 2, at the left lateral surface of the check processing apparatus 1, a left end of a check transport path A is formed from the check insertion port 6 to the check discharge port 5. The check transport path A has a bent shape and includes a first transport path portion B which linearly extends from the front surface of the apparatus rearward of the apparatus, an arc-shaped transport path portion C which extends in an arc shape upward from the rear end of the first transport path portion B, and a linear second transport path portion D which longitudinally extends from the rear end of the arc-shaped transport path portion C toward the top surface of the apparatus. As described above, one lateral end of the check transport path A is opened, such that a check having a width greater than the check transport path A can be transported.

Sheet guide members 7A and 7B are attached to the lower part of the opening and closing unit cover 3. The check transport path A is formed by an upper guide surface 8 (guide surface/first guide surface) which is formed from the rear end of the opening and closing unit cover 3 to the rear portion of the sheet guide member 7A and the lower part of the sheet guide member 7B, and a lower guide surface 9 (second guide surface) which is formed near the middle case 2a so as to be opposite the upper guide surface 8 at a predetermined gap. In the upper guide surface 8, a portion near the front surface of the apparatus has an inclined surface 8a which is inclined obliquely upward toward the check insertion port 6. With the inclined surface 8a, the width (opening height) of the groove constituting the first transport path portion B is widened toward the check insertion port 6, such that a check is easily inserted manually.

Figure 3:
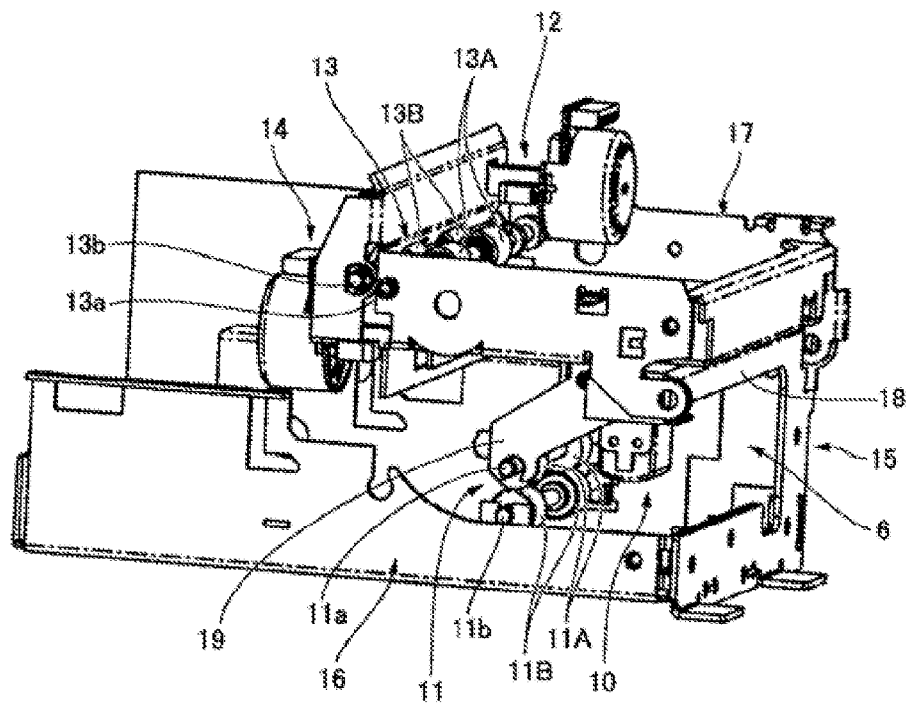
FIG. 3 is a perspective view (open position) of an apparatus frame and an internal mechanism.
Figure 4:
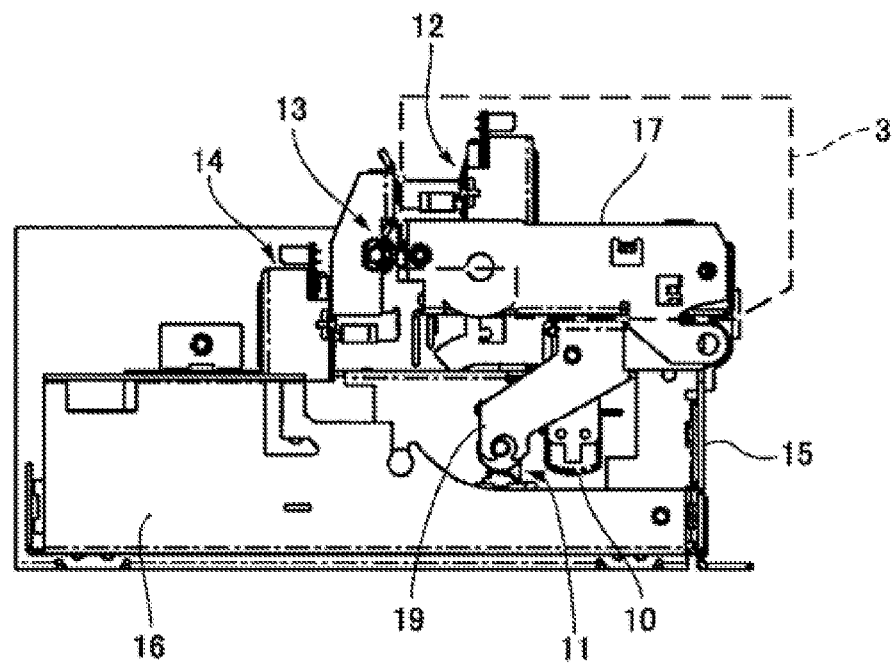
FIG. 4 is a side view (closed position) of an apparatus frame and an internal mechanism.
Figure 5:
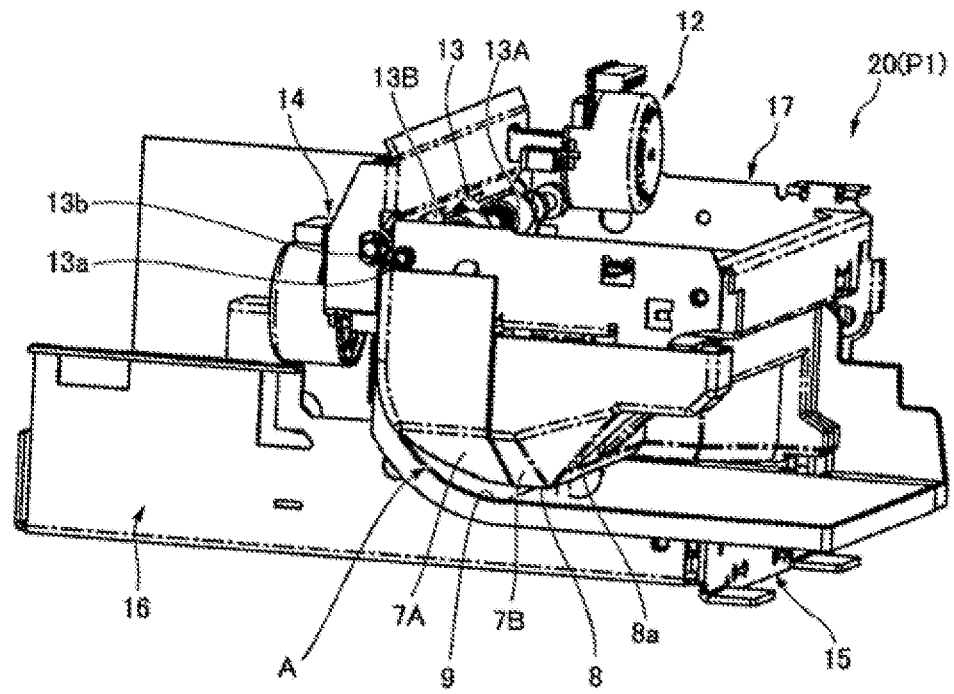
FIG. 5 is a perspective view (closed position) when a sheet guide member of a check transport path is added to FIG. 3.
Figure 6:
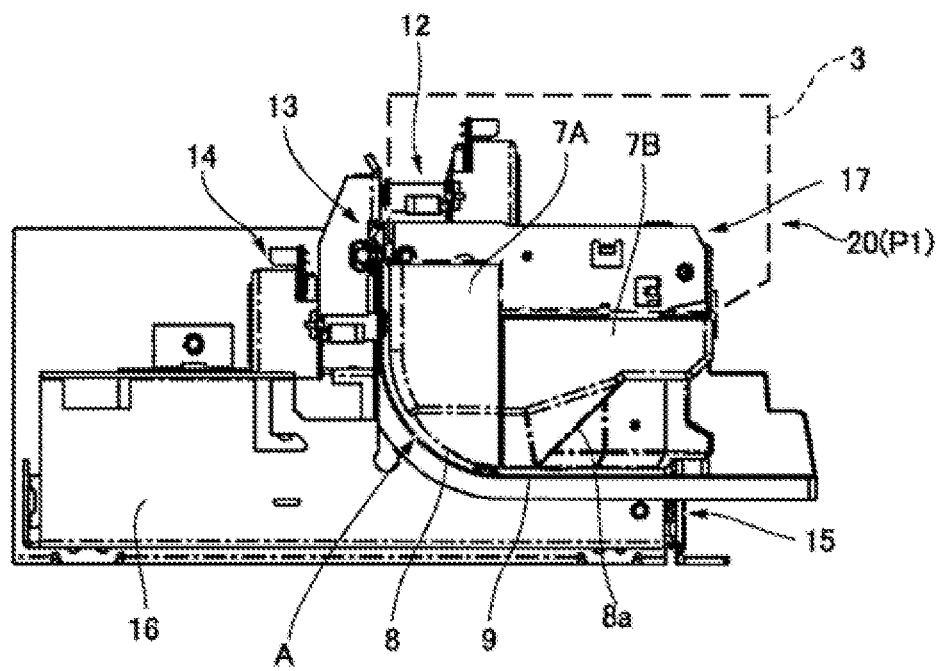
FIG. 6 is a side view (closed position) when the sheet guide member of the check transport path is added to FIG. 4.

FIGS. 3 and 4 are a perspective view and a side view of an apparatus frame and an internal mechanism of the check processing apparatus. FIGS. 5 and 6 are a perspective view and a side view when the portions of the sheet guide members (the sheet guide members 7A and 7B and the lower guide surface 9 of the middle case 2a) of the check transport path are added to the internal mechanism shown in FIGS. 3 and 4. In FIGS. 4 and 6, the attachment position of the opening and closing unit cover 3 is indicated by a broken line. Although in this embodiment, a roll sheet unit which performs printing on a roll sheet is provided in a portion covered by the roll sheet unit cover 4 on the rear side of the apparatus, in the following description and the drawings, the roll sheet unit will not be shown and description thereof will be omitted.

As shown in FIGS. 3 and 4, provided in the first transport path portion B are a magnetic reading head 10 (first head) which is arranged in a downward direction in the vicinity of the lower end of the inclined surface 8a, and a pair of transport rollers 11 (first pair of rollers) which are arranged on the rear side of the apparatus from the magnetic reading head 10. The magnetic reading head 10 is configured, to read magnetic ink characters (MICR characters) recorded on a check. The check processing apparatus 1 determines the validity of the check, the account number, and the like on the basis of the read information.

The pair of rollers 11 includes a roller 11A which is arranged near the upper guide surface 8 and a roller 11B which is arranged so as to be opposite the roller 11A from the lower guide surface 9 side. The surfaces of these rollers are brought into contact with each other in the up-down direction so as to sandwich the check between the rollers. Any one of the rollers 11A and 11B is driven, such that the check sandwiched by the pair of rollers 11 is transported.

Provided in the second transport path portion D are a recording head 12 (second head) for front surface printing which is arranged slightly lower than the check discharge port 5, a pair of rollers 13 (second pair of rollers) which are arranged at the lower part of the apparatus from the recording head 12, and a recording head 14 for rear surface printing which is arranged lower than the pair of rollers 13. The pair of rollers 13 includes a roller 13A (separating roller), which is arranged at the front surface of the apparatus in the second transport path portion D, and a roller 13B (fixed roller) which is arranged so as to be opposite the roller 13A from the rear side of the apparatus. The surfaces of these rollers are brought into contact with each other in the front-back direction of the apparatus so as to sandwich the check between the rollers. Any one of the rollers 13A and 13B is driven, such that the check sandwiched by the pair of rollers 13 is transported.

The recording head 12 is arranged on the front side of the apparatus in the second transport path portion D in a state where the head surface turns toward the rear side of the apparatus. That is, the recording head 12 is a head which can perform printing on the surface (the front surface of the check) turning upward at the time of insertion into the check insertion port 6. The recording head 12 prints the address items, such as the recipient, date, and the amount, on the front surface of the check. Meanwhile, the recording head 14 is arranged on the rear side of the apparatus in the second transport path portion D in a state where the head surface turns toward the front side of the apparatus. That is, the recording head 14 is a head which can perform printing on the surface (the rear surface of the check) turning downward at the time of insertion into the check insertion port 6. The recording head 12 prints the address items, such as the amount or the authentication code, on the rear surface of the check. In, this embodiment, the recording heads 12 and 14 are a dot impact type printing head which transfers ink on an ink ribbon to the check by an impact head. A recording head using a different printing method may be used.

Figure 7:
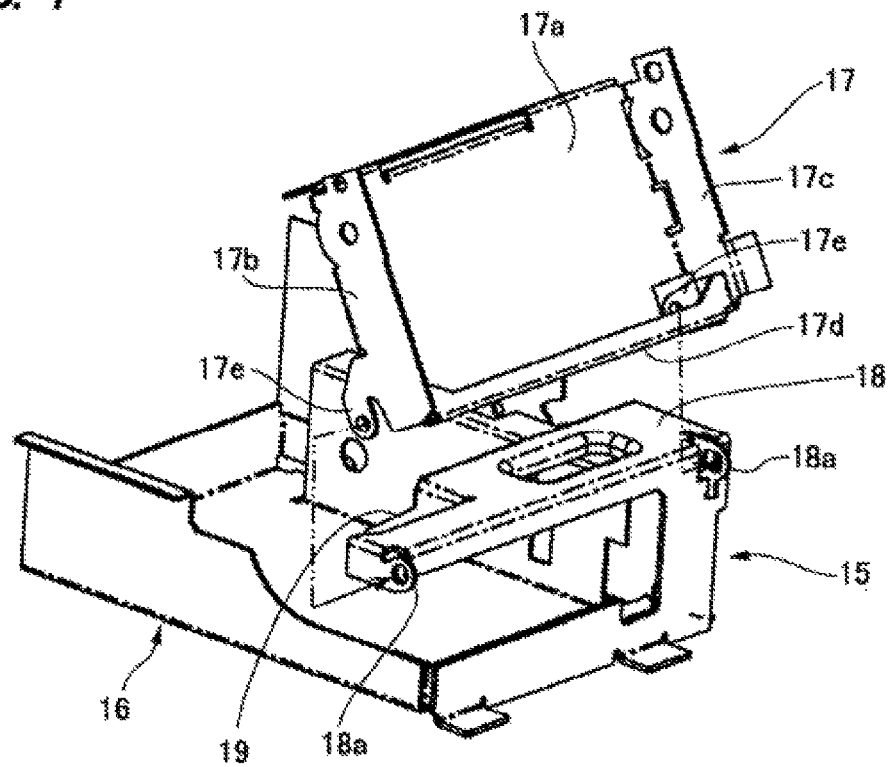
FIG. 7 is an exploded perspective view of the apparatus frame.
Figure 8:
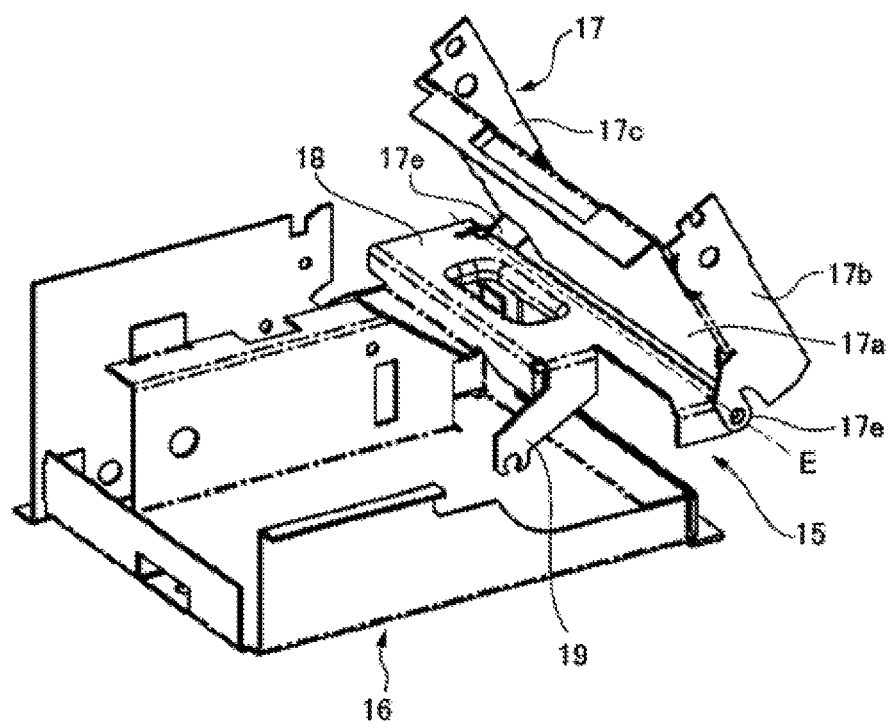
FIG. 8 is a perspective view of the apparatus frame when viewed from an oblique rear side.
Figure 9:
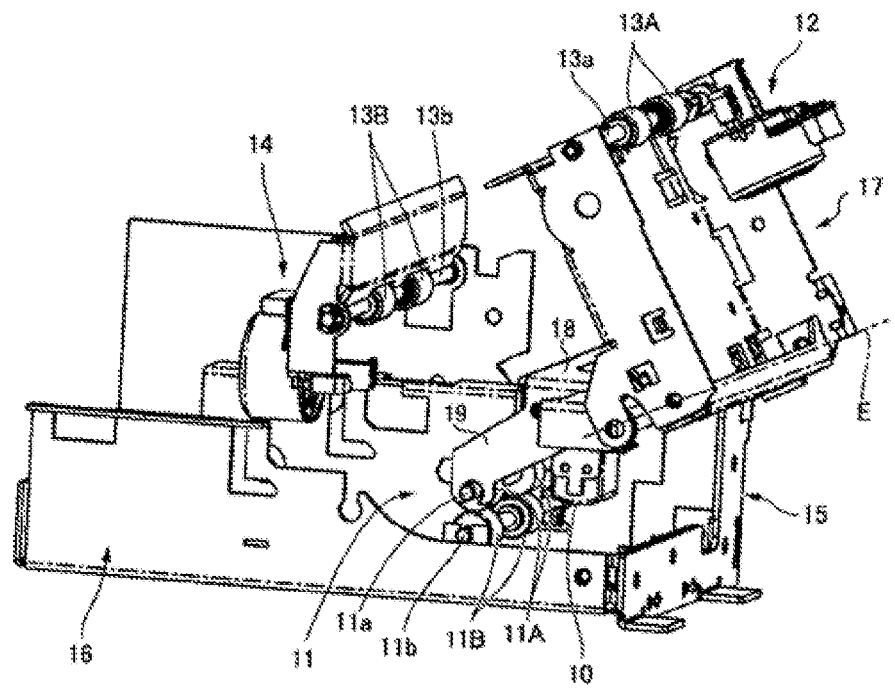
FIG. 9 is a perspective view (open position) of the apparatus frame and the internal mechanism.
Figure 10:
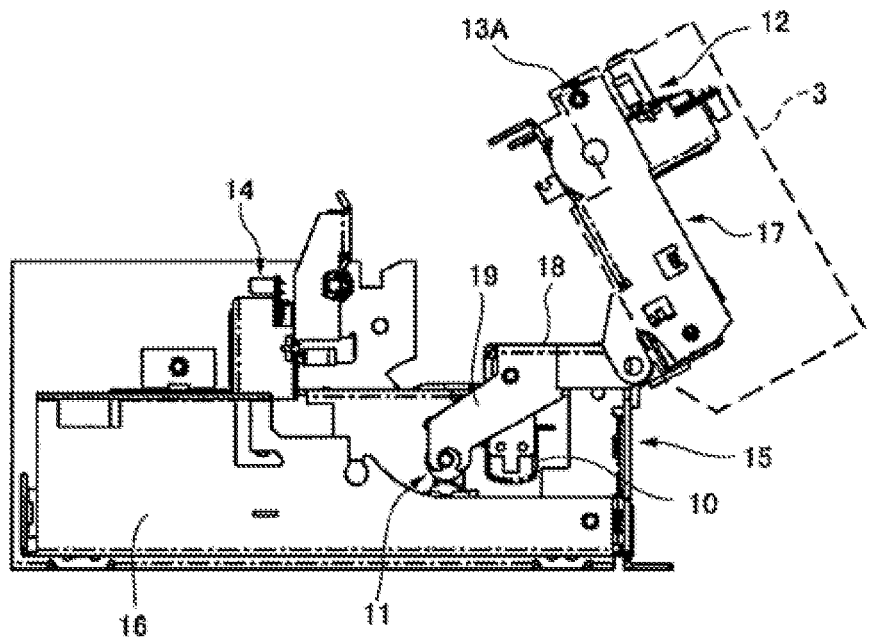
FIG. 10 is a side view (open position) of the apparatus frame and the internal mechanism.
Figure 11:
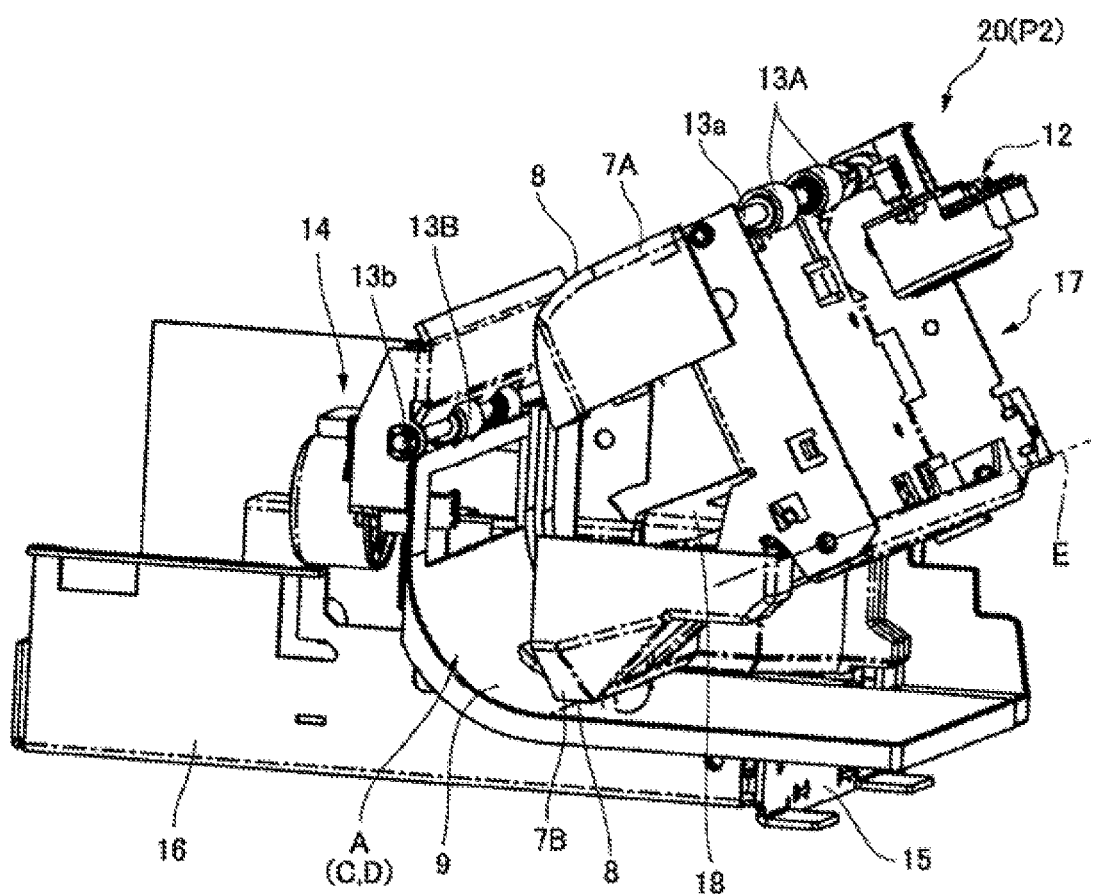
FIG. 11 is a perspective view (open position) when the sheet guide member of the check transport path is added to FIG. 9.
Figure 12:
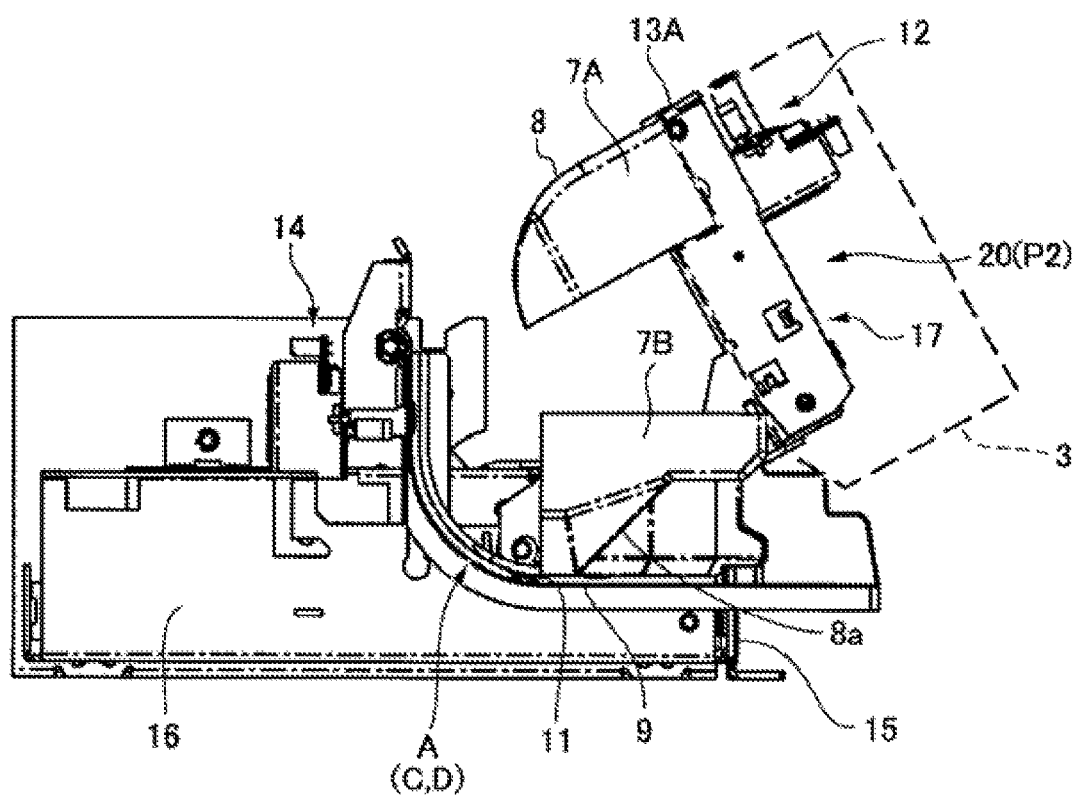
FIG. 12 is a side view (open position) when the sheet guide member of the check transport path is added to FIG. 10.

FIG. 7 is an exploded perspective view of the portion of the apparatus frame in FIGS. 3 to 6. FIG. 8 is a perspective view of the apparatus frame when viewed from an oblique rear side. The check processing apparatus 1 includes a front frame 15 which constitutes the front surface portion of the apparatus, a main frame 16 which extends from the lower end and the lateral end of the front frame 15 toward the rear side of the apparatus, and a carriage frame 17 which is supported at the upper part of the front frame 15. The main frame 16 is fixed to or formed as a single body with each section of the front frame 15.

The front frame 15 is shaped such that a portion corresponding to the check insertion port 6 is cut out in a concave shape and opened to the left. The front frame 15 includes an upper edge frame 18 (cantilevered frame) which extends in a state of being cantilevered so as to traverse the upper part of the check insertion port 6. The magnetic reading head 10 is fixed to the lower part of the upper edge frame 18 in the front frame 15 through the upper edge frame 18 or an attachment member which extends downward from the upper edge frame 18.

The upper edge frame 18 extends in a planar shape with a predetermined width to the rear side of the apparatus from the right end to a position to the left side slightly from the center in the apparatus width direction. The upper edge frame 18 has a planar shape in which the deep left portion is cut out in a stepwise shape when viewed from the front surface of the apparatus. A lateral frame 19 extends obliquely downward from the edge of the cutout portion toward the rear side of the apparatus. As shown in FIGS. 3 and 4, at, the forefront portion of the lateral frame 19, a bearing section is formed which rotatably supports the rotary shaft of the roller 11A. A rotary shaft 11b of the roller 11B which is opposite the roller 11A is rotatably supported by a bearing section provided in the main frame 16.

The carriage frame 17 is formed in a shallow boxlike shape in which lateral plates 17b and 17c rise upward from both the left and right edges of a bottom plate 17a having a rectangular planar shape, and a front plate 17d is provided between the front ends of the lateral plates 17b and 17c. Attachment pieces 17e with shaft holes are formed at the lower part of the front ends of the left and right lateral plates 17b and 17c. The attachment pieces 17e are respectively provided at the positions corresponding to attachment pieces 18a formed at both the left and right ends of the upper edge frame 18. The carriage frame 17 is rotatably attached to the upper edge frame 18 by aligning the attachment pieces 17e with the attachment pieces 18a and inserting support pins (not shown) or the like into the shaft holes. That is, the carriage frame 17 is rotatably provided around a rotation center line E which extends in the apparatus width direction along the upper edge frame 18.

FIGS. 9 to 12 are perspective views and side views showing a state where the carriage frame is revolved to the position of FIG. 8 (an open position P2 described below). Similarly to FIGS. 3 and 4, FIGS. 9 and 10 show only the portions of the apparatus frame and the internal mechanism. Similarly to FIGS. 5 and 6, FIGS. 11 and 12 show a state where the portions of the sheet guide members of the check transport path are added. The carriage frame 17 is configured to move between the transverse position shown in FIGS. 3 to 6 and the position shown in FIGS. 9 to 12 having revolved obliquely upward. That is, in this embodiment, the carriage frame 17 and the members loaded onto the carriage frame 17 are constituted as an opening and closing unit 20 which is rotatably supported by the upper edge frame 18. The opening and closing unit 20 is configured to move between a closed position P1 shown in FIGS. 5 and 6 and an open position P2 shown in FIGS. 11 and 12. The open position P2 of the opening and closing unit 20 may be set at a position having further revolved to the front side of the apparatus from the position shown in FIGS. 11 and 12.

A rotary shaft 13a of the roller 13A is rotatably supported at the rear ends of the lateral plates 17b and 17c in the carriage frame 17. Meanwhile, a rotary shaft 13b of the roller 13B is supported by the main frame 16. As described above, the pair of rollers 11 is configured such that one roller 13A is included in the opening and closing unit 20 and the other roller 13B is not included in the opening and closing unit. Thus, when the opening and closing unit 20 revolves upward around the rotation center line E, the roller 13A and the rotary shaft 13a are moved alone with the carriage frame 17 and separated from the roller 13B and the rotary shaft 13b. Therefore, when the opening and closing unit 20 is moved, to the open position P2, a recording medium is released from the sandwiched state between the pair of rollers 13, such that the recording medium can be easily removed.

Loaded on the carriage frame 17 are provided a carriage (not shown) on which the recording head 12 is loaded, and a carriage scanning mechanism which reciprocates the carriage in the apparatus width direction by a timing belt. The opening and closing unit cover 3 is attached so as to cover the upper part of the mechanism. In addition, out of the two sheet guide members 7A and 7B which form the upper guide surface 8 of the check transport path A, the sheet guide member 7A which is arranged on the rear side of the apparatus is attached to the carriage frame 17. Thus, when the carriage frame 17 revolves around the rotation center line E, in addition to the roller 13A and the rotary shaft 13a, the recording head 12 and the carriage scanning mechanism, and the sheet guide member 7A and the opening and closing unit cover 3 are moved upward of the apparatus as a single body with the carriage frame 17.

At the closed position P1, the opening and closing unit 20 is lowered along the check transport path A, and the portion from the rear surface of the sheet guide member 7A to the lower surface functions as the upper guide surface 8. That is at the closed position P1, the sheet guide member 7A defines the arc-shaped transport path portion C and the second transport path portion D. At the closed position P1, the printing operation of the recording head 12 and the transport operation of the pair of rollers 13 are possible. Therefore, in the check processing apparatus 1, the opening and closing unit 20 is moved to the closed position P1, such that the transport operation of the recording medium of the pair of rollers 11 and 13 and printing, reading, or the like of each head of the recording heads 12 and 14 and the magnetic reading head 10 can be performed.

Meanwhile, at the open position P2, the opening and closing unit 20 rises obliquely upward of the check transport path A. In this state, the member which covers the arc-shaped transport path portion C and the upper part of the second transport path portion D and the upper guide surface 8 of the portion both move to the front surface side of the apparatus. That is, in this state, the arc-shaped transport path portion C including the transport position of the pair of rollers 11, and the second transport path portion D including the transport position of the pair of rollers 13 are exposed to the outside. Thus, it is possible to easily remove a recording medium jammed in the deep portion from the pair of rollers 11 arranged at the rear end of the first transport path portion B to the pair of rollers 13 arranged immediately below the recording head 12. In addition, since the mechanisms which are arranged in the arc-shaped transport path portion C and the second transport path portion D are exposed to the outside, it is possible to perform maintenance of the arc-shaped transport path portion C and the second transport path portion D. At this time, since the internal mechanisms, such as the recording head 12, loaded onto the opening and closing unit 20 are also exposed to the outside, it is also possible to perform maintenance of the internal mechanism. It is desirable to provide a holding mechanism for holding the opening and closing unit 20 at the open position P2 during maintenance.

The sheet guide member 7B which is arranged at the position near the check insertion port 6 is attached to the front frame 15 and thus is not moved even when the carriage frame 17 revolves. Similarly, the configuration is made such that the magnetic reading head 10 which is supported by the front frame 15 and the pair of rollers 11 which are supported by the front frame 15 and the main frame 16 are not moved even when the carriage frame 17 revolves. In this embodiment, at the time of the reading operation of the magnetic reading head 10, it is desirable to transport the recording medium to the reading position with high accuracy. In consideration of this point, the configuration is made such that the pair of rollers 11 arranged in the vicinity of the magnetic reading head 10 is not loaded onto the opening and closing unit 20. Therefore, it is possible to suppress degradation of the attachment accuracy of the pair of rollers 11 due to the opening and closing operation of the opening and closing unit 20, and to suppress degradation of the transport accuracy.

Although in the above-described embodiment, the three heads of the magnetic reading head 10 and the recording heads 12 and 14 are loaded, the invention is not limited thereto. For example, any one of the heads may not be provided, or another head may be added. For example, the invention may be applied to a scanner having an optical reading head, a printer having only a plurality of recording heads, or the like. At this time, a pair of rollers which transport the recording medium in the vicinity of each head are fixed in the same manner as the pair of rollers 11 or separated in the same manner as the pair of rollers 13 in accordance with the required transport accuracy or the like at each transport position. The shape of the transport path is not limited to the above-described bent shape, and may be appropriately set in accordance with the arrangement of the heads in the apparatus. The portion of the check transport path A which can be opened/closed by the opening and closing unit 20 is not limited to the entire portion including the arc-shaped transport path portion C and the second transport path portion D, as described above. The opening and closing unit 20 may be configured such that the portion is only the arc-shaped transport path portion C or at least a portion including the transport position of any of the pair of rollers 11 or the pair of rollers 13. Even in such a configuration, the transport position of the pair of transport rollers which at the deep position of the check transport path A can be opened/closed, making it easy to remove a recording medium jammed in the portion. With regard to the recording medium, a typical sheet-shaped medium, such as a check, or a continuous sheet may be used.

What is claimed is:

1. A recording medium processing apparatus, comprising:
a first head that performs recording or reading information with respect to a sheet-shaped recording medium;
a second head that performs recording or reading information with respect to the sheet-shaped recording medium, said second head being mounted onto an opening and closing unit;
a pair of rollers that sandwiches therebetween the recording medium and transports the recording medium in a transport path of the recording medium passing at least one of the first head and the second head; and
a cantilevered frame that includes an extending portion which extends in a direction traversing the transport path and a support portion which supports the extending portion;
wherein one end of the opening and closing unit and the other end of which are rotatably supported by the cantilevered frame so that the opening and closing unit is revolvable around the extending portion between a closed position where the opening and closing unit covers at least a transport portion by the pair of rollers in the transport path and an open position where the transport portion is exposed to the outside,
wherein the cantilevered frame is an upper edge portion of a front frame which constitutes a front surface portion of the recording medium processing apparatus, formed with an insertion port of the recording medium into the transport path, and
wherein the opening and closing unit moves around a rotation center line extending along the upper edge portion between the open position where the opening and closing unit is raised upward relative to the transport path and the closed position where the opening and closing unit is lowered along the transport path.

2. The recording medium processing apparatus as set forth in claim 1,
wherein the cantilevered frame is an upper edge portion of a front frame which constitutes a front surface portion of the recording medium processing apparatus, formed with the insertion port of the recording medium into the transport path, and
wherein the opening and closing unit moves around a rotation center line extending along the upper edge portion between the open position where the opening and closing unit is raised upward of the transport path and the closed position where the opening and closing unit lowered along the transport path.

3. The recording medium processing apparatus as set forth in claim 2,
wherein the transport path includes:
a first transport path portion which extends from the insertion port rearward of the apparatus;
an arc-shaped transport path portion which is curved upward from a rear end of the first transport path portion; and
a second transport path portion which extends from a rear end of the arc-shaped transport path portion to a discharge port of the recording medium, formed in a top surface of the recording medium processing apparatus, and
wherein at least the arc-shaped transport path portion is exposed to the outside when the opening and closing unit is in the open position.

4. The recording medium processing apparatus as set forth in claim 3,
wherein the first head is provided in the first transport path portion and the second head is provided in the second transport path portion,
wherein the pair of rollers includes a first pair of rollers which sandwich therebetween and transport the recording medium in the vicinity of the first head and a second pair of rollers which sandwich between and transport the recording medium in the vicinity of the second head, and
wherein at least a portion of the transport path between the first pair of rollers and the second pair of rollers is exposed to the outside when the opening and closing unit is in the open position.

5. The recording medium processing apparatus as set forth in claim 4, wherein at least one of the first pair of rollers and the second pair of rollers includes a separating roller which is attached to the opening and closing unit and a fixed roller which is attached to a main frame fixed to or integrally formed with the front frame such that the recording medium is sandwiched between the separating roller and the fixed roller.

6. The recording medium processing apparatus as set forth in claim 5,
wherein the first head is a magnetic reading head, and
wherein the first pair of rollers is configured such that the recording medium is sandwiched between a roller attached to the front frame and a roller attached to the main frame.

7. The recording medium processing apparatus as set forth in claim 5, wherein the second head is a recording head.

8. The recording medium processing apparatus as set forth in claim 1, wherein the opening and closing unit is provided with a guide surface which guides the recording medium along the transport path when the opening and closing unit is in the closed position.

9. The recording medium processing apparatus as set forth in claim 1,
wherein the transport path is a groove which is defined by a first guide surface guiding one surface of the recording medium and a second guide surface guiding the other surface of the recording medium, and
wherein the groove is opened toward a forefront of the cantilevered frame.

10. The recording medium processing apparatus as set forth in claim 1, wherein one side of the transport path in a direction perpendicular to a transport direction of the recording medium is open to the exterior of the recording medium processing apparatus.

11. The recording medium processing apparatus as set forth in claim 10, further comprising a guide portion which is disposed along the other side of the transport path to guide the recording medium on the transport path.

12. The recording medium processing apparatus as set forth in claim 1, wherein the cantilevered frame is fixed relative to a front frame.

13. The recording medium processing apparatus as set forth in claim 1, wherein a distance between the pair of rollers in a state where the opening and closing unit is at the open position is larger than the distance in a state where the opening and closing unit is at the closed position.

14. The recording medium processing apparatus as set forth in claim 1, wherein the pair of roller is configured to sandwich therebetween the recording medium in a state where the opening and closing unit is at the closed position.

15. The recording medium processing apparatus as set forth in claim 1, wherein the second head moves with the opening and closing unit.

* * * * *